Patented Jan. 1, 1935

1,986,276

UNITED STATES PATENT OFFICE 1,986,276

DYE PRODUCING COMPOSITION

Eugene A. Markush, Jersey City, N. J., assignor to Pharma Chemical Corporation, New York, N. Y., a corporation of New York No Drawing. Application November 25, 1932, Serial No. 644,330

48 Claims. (Cl. 8—6)

My invention relates to new dye producing compositions, means for applying the same, and the results produced thereby.

I have found that water soluble diazo-imino compound prepared by condensation of molecular proportions of a diazotized aromatic amino-compound, or an aromatic nitrosamine, with a partly or completely hydrogenated heterocyclic imine containing one or more acid groups produce stable compositions when mixed with coupling components, and that these compositions yield valuable dyes in substance as well as in dyeing and printing processes.

Mixtures of these new diazo-imino compounds with coupling components may be stored for indefinite periods of time and when desired may be readily converted into valuable dyes for the production of valuable dyeings and prints upon cotton and rayon.

I have found that if cotton fibers, or cotton fabrics, be treated with the compositions described and claimed herein and submitted to acidifying conditions, or acidifying substances, valuable dyes are produced thereby, the acidifying reaction splitting the diazo-imino compound and the diazo compound, thus formed, combining with the coupling component.

The diazo-imino component probably may be represented by the general formula:—

in which R represents the nucleus of a diazotizable aromatic amino-compound, X represents a partly or completely hydrogenated heterocyclic imino compound $a$ represents one or more acid groups, $n$ represents numbers 1 or 2 and in which the —N=N— (so called diazo) radical is linked to the nucleus via the NH of the heterocyclic imine.

The coupling components of my compositions are those compounds which will combine with the diazotized aromatic amino-compound of the composition to form a colored compound.

I give the following as examples of the following of the process of my invention for the production of my new compositions, their methods of application and use and the results produced thereby:—

Example 1

1 mole of the diazo-imino compound obtainable by condensation of 1 mole of diazotized chloranisidine and 1 mole of proline (alpha-carboxy-pyrrolidine), are mixed with 1 mole of diaceto-acet-benzidid and sufficient sodium hydroxide to render the mixture soluble.

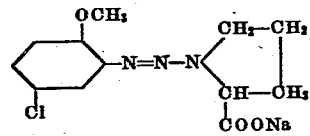

The above may be employed as follows:—

2 parts of the above mixture are dissolved in 7 parts water, ½ part para soap, 1½ parts caustic soda solution 30 Bé, 2½ parts cellosolve or denatured alcohol and the resulting solution thickened to a paste with 15 parts starch-gum tragacanth. This paste is printed on the cotton cloth and hung up to dry. The printed cloth may be developed immediately after drying, or the dried printed cloth stored until required by the printer. The developing is done by placing the cloth in an ager and steaming in the presence of acetic or formic acid vapor for five minutes. It is then soaped hot, rinsed well and dried.

Where the use of an ager is inconvenient, the developing may be done by immersing the printed cloth in a warm bath of a mixture of acetic and formic acids in the presence of Glauber's salt. This developing bath is heated until the shades have reached maximum fullness. Furthermore, the printed material may be padded with the acid mixture using the well known padding method after which the material is dried with heat, rinsed, soaped, washed well and dried.

The mixture may also be used to prepare the dyestuff in substance. The powder is dissolved in water and a small quantity of alcohol or cellosolve and caustic soda solution added until the whole is strongly alkaline. Acetic acid is now added in excess and the mixture stirred and heated. The dyestuff precipitates.

The printing paste of this mixture when printed on cotton or rayon and developed yields a bright clear yellow of excellent fastness to light, rubbing, kier boiling and chlorine.

Example 2

1 mole of the diazo-imino compound obtainable by condensation of 1 mole of diazotized ortho-amino-diphenyl-ether and 1 mole of piperidine-mono or-dicarboxylic acid are mixed with 1 mole of beta-hydroxy naphthoic acid-4-chlor-2-amino-anisidid and sufficient sodium hydroxide to render the mixture soluble. This mixture when printed produces clear scarlet shades on cotton and rayon, fast to light, rubbing, kier boiling and chlorine.

Example 3

1 mole of the diazo-imino compound obtainable by condensation of 1 mole of diazotized ortho-amino-diphenyl-ether and 1 mole of sulfo-benzylene-imine (Zentr. 1905, I 674; 1906, I 1413–1416), is mixed with 1 mole of diazotized diacetylaceto benzidid and the so obtained mixture applied in the usual manner.

Example 4

1 mole of the diazo-imino compound obtainable by condensation of 1 mole of tetrazotized dianisidine and 2 moles of sulpho or carboxy (phenyl-dimethyleneimine and 2 moles of beta-hydroxynaphthoic-anilid

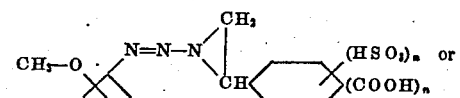
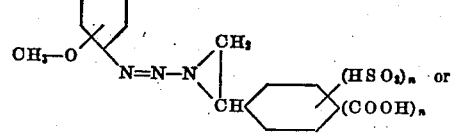

and sufficient sodium carbonate or sodium hydroxide to render the mixture soluble. This mixture when prepared for printing and applied on cotton or rayon yields bright blue shades.

Example 5

1 mole of the diazo-imino compound obtainable by condensation of 1 mole of diazotized ortho-amino-diphenyl-ether and 1 mole sulpho-carboxyl-benzyleneimine is mixed with 1 mole of beta-hydroxy-naphthoic-acid-4-chlor-2-amino-anisidid. This mixture prepared for printing produces brilliant scarlet shades on cotton or rayon, fast to light, rubbing, kier boiling and chlorine.

Example 6

1 mole of the diazo-imino compound obtainable from diazo-diphenyl-azo-hydroxy-carboxyl-benzol and 1 mole of proline are mixed with 1 mole of diacetoacetbenzidid and sufficient sodium hydroxide to render the mixture soluble. The printing paste of this mixture when printed on cotton or rayon and developed yields a yellow shade of good fastness to light, rubbing, kier boiling and chlorine.

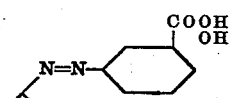

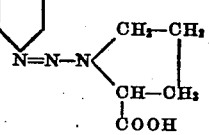

I do not limit myself to the cited examples of my invention including all compositions produced by diazo-imino compound obtainable from partly or completely hydrogenated heterocyclic imids containing one or more acid groups with any diazotizable amino compound mixed with any coupling component.

Among the diazotizable amino compounds suitable for my process are o-chlor-aniline, p-chlor-aniline, 4-chlor-2-amino-anisol, o-anisidine, p-nitro-p-toluidine, o-amino-diphenylether, dianisidine, dichlor-aniline, 5-nitro-2-amino-1-methyl-benzene, 2-amino-4-methoxy-5-benzoyl-amino-1-chloro-benzene, 4-amino-1.3-dimethyl-benzene, 3-amino-4-methoxy-6-benzoylamino-1-methylbenzene, sulphanilic acid, 6-amino-3-benzoylamino-4-ethoxy-1-methoxybenzene.

The following partly or completely hydrogenated soluble heterocyclic diazo-imino compounds are specially adaptable in the preparation of mixtures with coupling compounds.

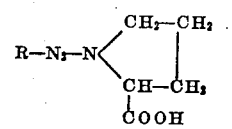

Diazo-N-(alpha-carboxy-pyrrolidine)

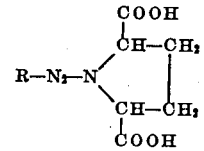

Diazo-N-(alpha-1-alpha-2-dicarboxy-pyrrolidine)

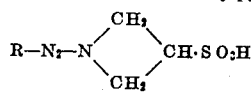

Diazo-N-(trimethylene-imine-sulfonic acid).

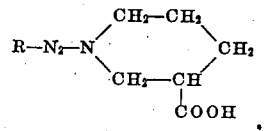

Diazo-N-(carboxy-piperidine)

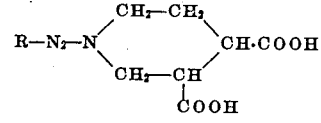

Diazo-N-(loipoinic acid)

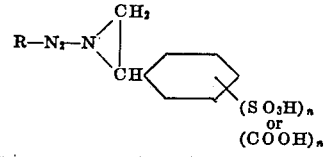

$n=1$ or more

Diazo-N-[sulfo (or carboxy)-phenyl-dimethylene-imin]

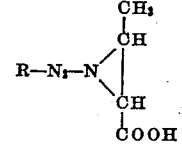

Diazo-N-(methyl-carboxy dimethylene-imin)

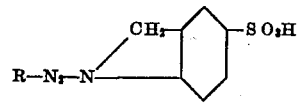

Diazo-N-(sulfo-benzylene-imin)

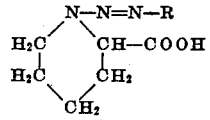

Diazo-N-(alpha-carboxy-piperidine) or diazo-N-(hexahydropicolinic acid)

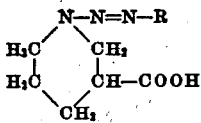

Diazo-N-(beta-carboxy-piperidine) or diazo-N-(hexahydro-nicotinic acid)

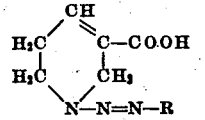

Diazo-N-guvacin or diazo-N-(tetrahydro-nicotinic acid)

By diazotizable amino compounds I mean those amino compounds which are capable of mono-diazotation, as amino compounds containing one diazotizable amino-group and those which are capable of poly-diazotation, as amino compounds having more than one diazotizable amino-group.

I do not limit myself to the particular chemical compounds, times, quantities, temperatures, or steps of procedure particularly mentioned and described, as these are given simply as a means of explaining my invention.

What I claim is:—

1. As a new composition of matter, a mixture of combinable quantities of a coupling component and a diazo-imino compound producible from the combination of a diazotized amino-compound and a heterocyclic imine which is at least partly hydrogenated and which contains at least one solubilizing acid group, said diazo-imino compound being soluble in the presence of an alkali and being split up upon acid treatment into its original heterocyclic compound and the diazo compound of its original amino-compound, said diazo compound being capable of combining with said coupling compound forming a colored compound.

2. As a new composition of matter, a mixture of combinable quantities of a coupling component and an alkali metal salt of a diazo-imino compound producible from the combination of a diazotized amino-compound and a heterocyclic imine which is at least partly hydrogenated and which contains at least one solubilizing acid group, said diazo-imino compound being soluble in the presence of an alkali and being split up upon acid treatment into its original heterocyclic compound and the diazo compound of its original amino-compound, said diazo compound being capable of combining with said coupling component forming a colored compound.

3. As a new composition of matter, a mixture of combinable quantities of a coupling component, and a diazo-imino compound producible from the combination of a diazotized amino-compound and proline, said diazo-imino compound being soluble in the presence of an alkali and being split up upon acid treatment into proline and the diazo compound of the original amino-compound, said diazo compound being capable of combining with said coupling component forming a colored compound.

4. As a new composition of matter, a mixture of combinable quantities of a coupling component, and a diazo-imino compound producible from the combination of a diazotized amino-compound and an alkali-metal salt of proline, said diazo-imino compound being soluble in the presence of an alkali and being split up upon acid treatment into proline and the diazo compound of the original amino-compound, said diazo compound being capable of combining with said coupling component forming a colored compound.

5. As a new composition of matter, a mixture of combinable proportions of a coupling component and the diazo-imino compound producible from the combination of diazotized chlor-anisidine and proline, said diazo-imino compound being soluble in the presence of an alkali and being split up upon acid treatment into proline and diazotized chlor-anisidine, said diazo compound being capable of combining with said coupling component forming a colored compound.

6. As a new composition of matter, a mixture of combinable quantities of a coupling component and the diazo-imino compound producible from the combination of diazotized chlor-anisidine and alkali metal salt of proline, said diazo-imino compound being soluble in the presence of an alkali and being split up upon acid treatment into proline and diazotized chlor-anisidine, said diazo compound being capable of combining with said coupling component forming a colored compound.

7. As a new composition of matter, a mixture of combinable quantities of diaceto-acet-benzidid, and a diazo-imino compound producible from the combination of a diazotized amino compound and proline, said diazo-imino compound being soluble in the presence of an alkali and being split up upon acid treatment into proline and the diazo compound of the original amino-compound, said diazo compound being capable of combining with said diaceto-acet-benzidid forming a colored compound.

8. As a new composition of matter, a mixture of combinable quantities of diaceto-acet-benzidid and the diazo-imino compound producible from the combination of diazotized chlor-anisidine and proline, said diazo-imino compound being soluble in the presence of an alkali and being split up upon acid treatment into proline and diazotized chlor-anisidine, said diazo compound being capable of combining with said diaceto-acet-benzidid forming a colored compound.

9. The process which comprises applying to cellulosic fibers a composition comprising a mixture of combinable quantities of a coupling component and a diazo-imino compound producible from the combination of a diazotized amino compound and a heterocyclic imine which is at least partly hydrogenated and which contains at least one solubilizing acid group, said diazo-imino compound being soluble in the presence of an alkali and being split up upon acid treatment into its original heterocyclic compound and the diazo compound of its original amino compound and subjecting the thus treated fiber to acidification causing the thus produced diazo compound to combine with the coupling component, forming a dye.

10. The process which comprises applying to cellulosic fibers a composition comprising a mixture of combinable quantities of a coupling component and an alkali metal salt of a diazo-imino compound producible from the combination of a diazotized amino-compound and a heterocyclic imine which is at least partly hydrogenated and which contains at least one solubilizing acid group, said diazo-imino compound being soluble in the presence of an alkali and being split up upon acid treatment into its original heterocyclic compound and the diazo compound of its original amino compound and subjecting the thus treated fiber to acidification causing the thus produced diazo compound to combine with the coupling component, forming a dye.

11. The process which comprises applying to cellulose fibers a composition comprising a mixture of a coupling component and the diazo-imino compound producible from the combination of a diazotized amino compound and proline, said diazo-imino compound being soluble in the presence of an alkali and being split up upon acid treatment into proline and the diazo compound of the original amino-compound and subjecting the thus treated fiber to acidification causing the thus produced diazo compound to combine with the coupling component forming a dye.

12. The process which comprises applying to cellulose fibers a composition comprising a mixture of a coupling component and the diazo-imino compound producible from the combination of a diazotized amino-compound and an alkali-metal salt of proline, said diazo-imino compound being soluble in the presence of an alkali and being split up upon acid treatment into proline and the diazo compound of the original amino-compound and subjecting the thus treated fiber to acidification causing the thus produced diazo compound to combine with the coupling component forming a dye.

13. The process which comprises applying to cellulose fibers a composition comprising a mixture of a coupling component and the diazo-imino compound producible from the combination of a diazotized chlor-anisidine and proline, said diazo-imino compound being soluble in the presence of an alkali and being split up upon acid treatment into proline and the diazo compound of said chlor-anisidine and subjecting the thus treated fiber to acidification causing the thus produced diazo compound to combine with the coupling component forming a dye.

14. The process which comprises applying to cellulose fibers a composition comprising a mixture of a coupling component and the diazo-imino compound producible from the combination of a diazotized chlor-anisidine and an alkali metal salt of proline, said diazo-imino compound being soluble in the presence of an alkali and being split up upon acidification into proline and the diazo compound of said chlor-anisidine and subjecting the thus treated fiber to acid treatment causing the thus produced diazo compound to combine with the coupling component forming a dye.

15. The process which comprises applying to cellulose fiber a composition comprising a mixture of diaceto-acet-benzidid and the diazo-imino compound producible from the combination of diazotized chlor-anisidine and proline, said diazo-imino compound being soluble in the presence of alkali and being split up upon acid treatment into proline and the diazo-compound of said diaceto-acet-benzidid and subjecting the thus treated fiber to acidification causing the thus produced diazo compound to combine with the di-aceto-acet-benzidid forming a dye.

16. The process which comprises applying to cellulose fiber a composition comprising a mixture of diaceto-acet-benzidid and the diazo-imino compound producible from the combination of diazotized chlor-anisidine and an alkali metal salt of proline, said diazo-imino compound being soluble in the presence of alkali and being split up upon acid treatment into proline and the diazo-compound of said diaceto-acet-benzidid and subjecting the thus treated fiber to acid treatment causing the thus produced diazo compound to combine with the diaceto-acet-benzidid forming a dye.

17. As a new article of manufacture, cellulosic fibers treated with a composition comprising a mixture of a combinable quantity of a coupling component and a diazo-imino compound formed from the combination of a diazotized amino compound and a heterocyclic imine which is at least partly hydrogenated and which contains at least one solubilizing acid group, said diazo-imino compound being soluble in the presence of an alkali and being capable of being split up upon acid treatment into its original heterocyclic compound and the diazo compound of its original amino-compound, said diazo compound being combined with said coupling component forming a dye.

18. As a new article of manufacture, cellulosic fibers treated with a composition comprising a mixture of a combinable quantity of a coupling component and an alkali metal salt of a diazo-imino compound formed from the combination of a diazotized amino compound and a heterocyclic imine which is at least partly hydrogenated and which contains at least one solubilizing acid group, said diazo-imino compound being soluble in the presence of an alkali and being capable of being split up upon acid treatment into its original heterocyclic compound and the diazo compound of its original amino-compound, said diazo compound being combined with said coupling component forming a dye.

19. As a new article of manufacture, cellulose fibers treated with a composition comprising a mixture of a coupling component and the diazo-imino compound producible from the combination of a diazotized amino-compound and proline being soluble in the presence of an alkali and being capable of being split up upon acid treatment into proline and the diazo compound of the original imino-compound, said diazo compound being combined with said coupling compound forming a dye.

20. As a new article of manufacture, cellulose fibers treated with a composition comprising a mixture of a coupling component and the diazo-imino compound producible from the combination of a diazotized amino-compound and an alkali metal salt of proline, said diazo-imino compound being soluble in the presence of an alkali and being capable of being split up upon acid treatment into proline and the diazo compound of the original amino-compound, said diazo compound being combined with said coupling compound forming a dye.

21. As a new article of manufacture, cellulose fibers treated with a composition comprising a mixture of a coupling component and the diazo imino compound producible from the combination of a diazotized chlor-anisidine and proline, said diazo-imino compound being soluble in the presence of an alkali and being capable of being split up upon acid treatment into proline and the diazo compound of said chlor-anisidine, said diazo compound being combined with said coupling compound forming a dye.

22. As a new article of manufacture, cellulose fibers treated with a composition comprising a mixture of a coupling component and the diazo-imino compound producible from the combination of diazotized chlor-anisidine and an alkali metal salt of a proline, said diazo-imino compound being soluble in the presence of an alkali and being capable of being split up upon acid treatment into proline and the diazo compound of said chlor-anisidine, said diazo compound being combined with said coupling compound forming a dye.

23. As a new article of manufacture, cellulose fibers treated with a composition comprising a mixture of diaceto-acet-benzidid and the diazoimino compound producible from the combination of diazotized chlor-anisidine and proline, said diazo-imino compound being soluble in the presence of alkali and being split up upon acid treatment into proline and the diazo-compound of said aceto-acet-benzidid, said diazo compound being combined with said diaceto-acet-benzidid forming a dye.

24. As a new article of manufacture, cellulose fibers treated with a composition comprising a mixture of diaceto-acet-benzidid and the diazo-imino compound producible from the combination of diazotized chlor-anisidine and an alkali-metal salt of proline, said diazo-imino compound being soluble in the presence of alkali and being split up upon acid treatment into proline and the diazo-compound of said aceto-acet-benzidid, said diazo compound being combined with said diaceto-acet-benzidid forming a dye.

25. As a new composition of matter, a mixture of combinable quantities of a coupling component and a diazo-imino compound producible from the combination of a diazotized amino-compound and a heterocyclic imine which is completely hydrogenated and which contains at least one solubilizing acid group, said diazo-imino compound being soluble in the presence of an alkali and being split up upon acid treatment into its original heterocyclic compound and the diazo compound of its original amino-compound, said diazo compound being capable of combining with said coupling compound forming a colored compound.

26. As a new article of manufacture, cellulosic fibers treated with a composition comprising a mixture of a coupling component and a diazo-imino compound formed from the combination of a diazotized amino compound and a heterocyclic imine which is completely hydrogenated and which contains at least one solubilizing acid group, said diazo-imino compound being soluble in the presence of an alkali and being capable of being split up upon acid treatment into its original heterocyclic compound and the diazo compound of its original amino-compound, said diazo compound being combined with said coupling component forming a dye.

27. The process which comprises applying to cellulosic fibers a composition comprising a mixture of a coupling component and a diazo-imino compound producible from the combination of a diazotized amino-compound and a heterocyclic imine which is completely hydrogenated and which contains at least one solubilizing acid group, said diazo-imino compound being soluble in the presence of an alkali and being split up upon acid treatment into its original heterocyclic compound and the diazo compound of its original amino compound and subjecting the thus treated fiber to acidification causing the thus produced diazo compound to combine with the coupling component, forming a dye.

28. A process for coloring material which comprises first treating the material with a mixture comprising an ice color coupling component, and a diazoimino compound having the following general formula:

in which Aryl represents an aromatic nucleus free from sulfonic and carboxylic acid groups and R represents a pyrrolidine or piperidine nucleus containing at least one sulfonic or carboxylic acid group, then developing the color by subjecting the treated material to the action of a dilute acid at elevated temperature.

29. A composition of matter comprising an ice color coupling component and a diazoimino compound having the following general formula:

in which Aryl represents an aromatic nucleus free from sulfonic and carboxylic acid groups and R represents a pyrrolidine or piperidine nucleus containing at least one sulfonic or carboxylic acid group.

30. A process for coloring material which comprises first treating the material with a mixture comprising an arylamide of 2-hydroxy-3-naphthoic-acid and a diazoimino compound having the following general formula:

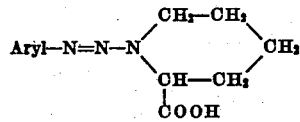

in which Aryl represents an aromatic nucleus of the benzene series, free from carboxylic and sulfonic acid groups, but which may contain members selected from the group consisting of alkyl, alkoxy, halogen, nitro and benzoyl-amino, then developing the color by subjecting the treated material to the action of dilute acetic acid at elevated temperatures.

31. A process for coloring material which comprises first treating the material with a mixture comprising an arylamide of 2-hydroxy-3-naphthoic acid and a diazoimino compound having the following general formula:

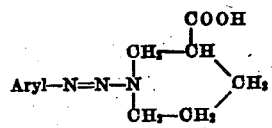

in which Aryl represents an aromatic nucleus of the benzene series, free from carboxylic and sulfonic acid groups, but which may contain members selected from the group consisting of alkyl, alkoxy, halogen, nitro and benzoyl-amino, then developing the color by subjecting the treated material to the action of dilute acetic acid at elevated temperatures.

32. A composition of matter comprising an arylamide of 2-hydroxy-3-naphthoic acid and a diazoimino compound having the following general formula:

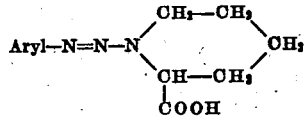

in which Aryl represents an aromatic nucleus of the benzene series, free from carboxylic and sulfonic acid groups, but which may contain members selected from the group consisting of alkyl, alkoxy, halogen, nitro and benzoyl-amino.

33. A composition of matter comprising an arylamide of 2-hydroxy-3-naphthoic acid and a diazoimino compound having the following general formula:

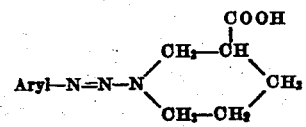

in which Aryl represents an aromatic nucleus of the benzene series, free from carboxylic and sulfonic acid groups, but which may contain members selected from the group consisting of alkyl, alkoxy, halogen, nitro and benzoyl-amino.

34. A composition of matter which comprises a coupling component and a diazoimino compound having the following general formula:

R—(—N=N—X)n wherein R represents the residue of an arylamine, X represents the residue of a heterocyclic imine which is at least partially hydrogenated and which contains at least one water-solubilizing group, and n represents the integer 1 or 2.

35. The composition defined in claim 34 wherein the component represented by R is free from water-solubilizing groups, wherein N is 2, and at least one of the components represented by X is capable of coupling with a diazotized aromatic amine through the imino group.

36. A composition of matter which comprises an ice color coupling component and a diazoimino compound having the following general formula:

R—N=N—X wherein R represents the residue of an arylamine and X represents the residue of a piperidine or pyrrolidine compound which contains at least one water-solubilizing group.

37. A composition of matter which comprises an arylamide of 2-3-hydroxy-naphthoic acid and a diazoimino compound having the following general formula:

R—N=N—X wherein R represents the residue of an arylamine of the benzene series and X represents the residue of a piperidine or pyrrolidine compound which contains at least one water-solubilizing group.

38. A composition of matter which comprises an arylamide of 2-3-hydroxy-naphthoic acid and a diazoimino compound having the following general formula:

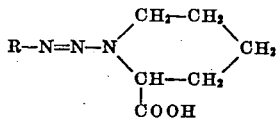

wherein R represents the residue of an arylamine of the benzene series which is free from water-solubilizing groups.

39. A process for coloring material which comprises first treating the material with a mixture comprising a coupling component and a diazoimino compound having the following general formula:

R—(—N=N—X)n wherein R represents the residue of an arylamine, X represents the residue of a heterocyclic imine which is at least partially hydrogenated and which contains at least one water-solubilizing group, and n represents the integer 1 or 2, then developing the color by subjecting the treated material to the action of a dilute acid.

40. A process for coloring material which comprises first treating the material with a mixture comprising a coupling component and a diazoimino compound having the following general formula:

R—(—N=N—X)n wherein R represents the residue of an arylamine which is free from water-solubilizing groups, X represents the residue of a heterocyclic imine which is at least partially hydrogenated, which contains at least one water-solubilizing group, and which is capable of coupling with a diazotized aromatic amine through the imino group, then developing the color by subjecting the treated material to the action of a dilute acid at elevated temperatures.

41. A process for coloring material which comprises first treating the material with a mixture comprising a coupling component and a diazoimino compound having the following general formula:

R—N=N—X wherein R represents the residue of an arylamine and X represents the residue of a piperidine or pyrrolidine compound which contains at least one water-solubilizing group, then developing the color by subjecting the treated material to the action of a dilute acid at elevated temperatures.

42. A process for coloring material which comprises first treating the material with an arylamide of 2-3-hydroxy-naphthoic acid and a diazoimino compound having the following general formula:

R—N=N—X wherein R represents the residue of an arylamine and X represents the residue of a piperidine or pyrrolidine compound which contains at least one water-solubilizing group, then developing the color by subjecting the treated material to the action of dilute acetic or formic acid at elevated temperatures.

43. A process for coloring material which comprises first treating the material with an arylamide of 2-3-hydroxy-naphthoic acid and a diazoimino compound having the following general formula:

R—N=N—X wherein R represents the residue of an arylamine of the benzene series and X represents the residue of a piperidine or pyrrolidine compound which contains at least one water-solubilizing group, then developing the color by subjecting the treated material to the action of dilute acetic or formic acid at elevated temperatures.

44. A process for coloring material which comprises first treating the material with an arylamide of 2-3-hydroxy-naphthoic acid and a diazoimino compound having the following general formula:

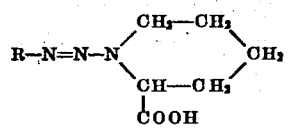

wherein R represents the residue of an arylamine of the benzene series which is free from water-solubilizing groups, then developing the color by subjecting the treated material to the action of dilute acetic or formic acid at elevated temperatures.

45. A composition of matter which comprises an arylamide of 2-3-hydroxy-naphthoic acid and a diazoimino compound having the following general formula

R—N=N—X wherein X represents the residue of a piperidine compound containing at least one water-solubilizing group and R represents the residue of an arylamine of the benzene series which is free from water-solubilizing groups.

46. A composition of matter which comprises an arylamide of 2-3-hydroxy-naphthoic acid and a diazoimino compound having the general formula

R—N=N—X wherein X represents the residue of a pyrrolidine compound containing at least one water-solubilizing group and R represents the residue of an arylamine of the benzene series which is free from water-solubilizing groups.

47. A process for coloring material which comprises first treating the material with an arylamide of 2-3-hydroxy-naphthoic acid and a diazo-imino compound having the following general formula

R—N=N—X where X represents the residue of a piperidine compound containing at least one water-solubilizing group and R represents the residue of an arylamine of the benzene series which is free from water-solubilizing groups, and then developing the color by subjecting the treated material to the action of dilute acetic acid at elevated temperatures.

48. A process for coloring material which comprises first treating the material with an arylamide of 2-3-hydroxy naphthoic acid and a diazoimino compound having the general formula

R—N=N—X wherein X represents the residue of a pyrrolidine compound containing at least one water-solubilizing group and R represents the residue of an arylamine of the benzene series which is free from water-solubilizing groups and then developing the color by subjecting the treated material to the action of dilute acetic acid at elevated temperatures.

EUGENE A. MARKUSH.